United States Patent
Hiroshige et al.

(10) Patent No.: US 7,199,902 B2
(45) Date of Patent: Apr. 3, 2007

(54) IMAGE PROCESSING METHOD, RECORDING MEDIUM, AND IMAGE PROCESSING APPARATUS

(75) Inventors: Akira Hiroshige, Nagano (JP); Yoshihiro Nakami, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 851 days.

(21) Appl. No.: 10/090,168

(22) Filed: Mar. 5, 2002

(65) Prior Publication Data

US 2002/0158975 A1    Oct. 31, 2002

Related U.S. Application Data

(63) Continuation of application No. PCT/JP01/05914, filed on Jul. 6, 2001.

(30) Foreign Application Priority Data

Jul. 6, 2000    (JP) ............................ P2000-204908

(51) Int. Cl.
  *G06F 15/00* (2006.01)
  *G06K 15/00* (2006.01)
  *G06K 9/40* (2006.01)
(52) U.S. Cl. ...................... 358/1.9; 358/3.27; 382/264
(58) Field of Classification Search ................ 358/1.9, 358/518, 512, 520, 523, 530, 3.27; 382/167, 382/162, 264; 345/687
  See application file for complete search history.

(56) References Cited

U.S. PATENT DOCUMENTS

| | | | | |
|---|---|---|---|---|
| 3,946,430 A | * | 3/1976 | Ueki et al. ..................... 348/41 |
| 5,091,963 A | * | 2/1992 | Litt et al. .................... 382/149 |
| 5,563,962 A | * | 10/1996 | Peters et al. ................. 382/261 |
| 5,592,571 A | * | 1/1997 | Peters ......................... 382/261 |
| 5,598,482 A | * | 1/1997 | Balasubramanian et al. .......................... 382/199 |
| 5,715,334 A | * | 2/1998 | Peters ......................... 382/254 |
| 5,963,676 A | * | 10/1999 | Wu et al. .................... 382/274 |
| 5,983,251 A | * | 11/1999 | Martens et al. ............. 708/203 |
| 5,987,094 A | * | 11/1999 | Clarke et al. ................ 378/62 |
| 6,122,405 A | * | 9/2000 | Khani ......................... 382/261 |
| 6,295,383 B1 | * | 9/2001 | Smitt et al. .................. 382/274 |

(Continued)

FOREIGN PATENT DOCUMENTS

JP    63-185355 U    11/1988

(Continued)

*Primary Examiner*—Madeleine A V Nguyen
(74) *Attorney, Agent, or Firm*—Sughrue Mion, PLLC

(57) ABSTRACT

An image processing apparatus includes: an image input unit into which image information is input and which can output the image information as electronic data; and an intensity computation unit for computing smoothing intensity for smoothing the electronic data, from the intensity of a predetermined color component included in the electronic data output from the image input unit. The smoothing intensity is set on the basis of a relationship between the intensity of a predetermined color component and the frequency of noise. When the intensity of a predetermined color component output from the pixel of interest is high, a rate at which the intensity of the predetermined color component output from the pixel of interest is to be distributed to surrounding pixels constituting the matrix is set to a large value. When the intensity of the predetermined color component is low, the rate is set to a small value.

9 Claims, 7 Drawing Sheets

U.S. PATENT DOCUMENTS

| | | | |
|---|---|---|---|
| 6,350,985 B1 * | 2/2002 | Rodricks et al. | 250/252.1 |
| 6,360,025 B1 * | 3/2002 | Florent | 382/261 |
| 6,717,655 B2 * | 4/2004 | Cheng et al. | 356/4.01 |
| 6,731,822 B1 * | 5/2004 | Sobel et al. | 382/264 |
| 6,782,137 B1 * | 8/2004 | Avinash | 382/254 |
| 2002/0001759 A1 * | 1/2002 | Ohashi et al. | 430/5 |
| 2002/0118887 A1 * | 8/2002 | Gindele | 382/260 |
| 2002/0159650 A1 * | 10/2002 | Hiroshige et al. | 382/261 |
| 2004/0046966 A1 * | 3/2004 | Fujita | 356/604 |

FOREIGN PATENT DOCUMENTS

| | | |
|---|---|---|
| JP | 6-30308 | 2/1994 |
| JP | 409330401 A * | 12/1997 |
| JP | 10-200754 | 7/1998 |
| JP | 10-208038 | 8/1998 |
| JP | 2000-101842 | 4/2000 |

* cited by examiner

| 0 | 0 | 0 | 0 | 0 |
|---|---|---|---|---|
| 0 | 3 | 21 | 3 | 0 |
| 0 | 21 | 158 | 21 | 0 |
| 0 | 3 | 21 | 3 | 0 |
| 0 | 0 | 0 | 0 | 0 |

/254

σ = 1

| 1 | 3 | 6 | 3 | 1 |
|---|---|---|---|---|
| 3 | 15 | 25 | 15 | 3 |
| 6 | 25 | 41 | 25 | 6 |
| 3 | 15 | 25 | 15 | 3 |
| 1 | 3 | 6 | 3 | 1 |

/253

σ = 2

| 6 | 9 | 10 | 9 | 6 |
|---|---|---|---|---|
| 9 | 13 | 14 | 13 | 9 |
| 10 | 14 | 16 | 14 | 10 |
| 9 | 13 | 14 | 13 | 9 |
| 6 | 9 | 10 | 9 | 6 |

/260

σ = 3

| 8 | 10 | 10 | 10 | 8 |
|---|---|---|---|---|
| 10 | 11 | 12 | 11 | 10 |
| 10 | 12 | 13 | 12 | 10 |
| 10 | 11 | 12 | 11 | 10 |
| 8 | 10 | 10 | 10 | 8 |

/257

σ = 4

| 9 | 10 | 10 | 10 | 9 |
|---|---|---|---|---|
| 10 | 11 | 11 | 11 | 10 |
| 10 | 11 | 12 | 11 | 10 |
| 10 | 11 | 11 | 11 | 10 |
| 9 | 10 | 10 | 10 | 9 |

/256

σ = 5

| 9 | 10 | 10 | 10 | 9 |
|---|---|---|---|---|
| 10 | 11 | 11 | 11 | 10 |
| 10 | 11 | 11 | 11 | 10 |
| 10 | 11 | 11 | 11 | 10 |
| 9 | 10 | 10 | 10 | 9 |

/255

σ = 6

| 10 | 10 | 10 | 10 | 10 |
|---|---|---|---|---|
| 10 | 11 | 11 | 11 | 10 |
| 10 | 11 | 11 | 11 | 10 |
| 10 | 11 | 11 | 11 | 10 |
| 10 | 10 | 10 | 10 | 10 |

/259

σ = 9

| 10 | 10 | 10 | 10 | 10 |
|---|---|---|---|---|
| 10 | 10 | 10 | 10 | 10 |
| 10 | 10 | 10 | 10 | 10 |
| 10 | 10 | 10 | 10 | 10 |
| 10 | 10 | 10 | 10 | 10 |

/250

IMAGE PROCESSING METHOD, RECORDING MEDIUM, AND IMAGE PROCESSING APPARATUS

This is a continuation of Application No. PCT/JP01/05914 with an international filing date of Jul. 6, 2001, which was published under PCT Article 21 (2) in Japanese, and the complete disclosure of which is incorporated into this application by reference.

BACKGROUND OF THE INVENTION

The present invention relates to an image processing method, a recording medium, and an image processing apparatus, which smooth electronic data pertaining to an input image and eliminate noise.

In the case of an image input device such as a digital still camera (hereinafter simply called a "digital camera") utilizing an image input element; e.g., a CCD, the image input element outputs an undesired electrical signal as well as an electrical signal corresponding to the amount of received light. As a result, the thus-output undesired electrical signal is included, as noise, in electronic data constituting an image. Noise tends to appear noticeably in a portion of the electrical signal having low luminance; that is, in a dark image portion.

In order to eliminate such noise in the image, there has hitherto been employed a method of smoothing all electronic data constituting an image or eliminating noise from an image in accordance with edge information.

However, when all electronic data constituting an image have been subjected to smoothing, all electronic data are subjected to smoothing despite differences in luminance from one area to another within an image. As a result, not only a portion of electronic data which has low luminance and involves conspicuous noise, but also a portion of the data which has high luminance and involves comparatively-less-conspicuous noise is smoothed, thereby deteriorating sharpness of an image. Consequently, noise concentrated at a low-luminance portion cannot be eliminated effectively.

Even in the case of a method of eliminating noise in accordance with edge information, there also arises a problem of enhancement of noise existing in a flat portion other than the edge regions.

SUMMARY OF THE INVENTION

An object of the present invention is to provides an image processing method, a recording medium, and an image processing apparatus, which change smoothing intensity in accordance with the intensity of a predetermined color component contained in electronic data constituting an input image, to thereby intensively eliminate noise, without enhancing noise in a flat portion.

By means of an image processing method, a recording medium, and an image processing apparatus according to the present invention, smoothing intensity to be used for smoothing the electronic data is computed from the intensity of a predetermined color component output from a pixel of interest from among a plurality of pixels constituting an image input by way of the input unit and from the intensity of predetermined color components output from surrounding pixels constituting a matrix centered on the pixel of interest. The smoothing intensity is set on the basis of a relationship between the intensity of a predetermined color component and the frequency of noise. When the intensity of a predetermined color component output from the pixel of interest is high, a rate at which the intensity of the predetermined color component output from the pixel of interest is to be distributed to surrounding pixels constituting the matrix is set to a large value. Further, when the intensity of the predetermined color component output from the pixel of interest is low, the rate at which the intensity of the predetermined color component output from the pixel of interest is to be distributed to surrounding pixels constituting the matrix is set to a small value. For example, smoothing intensity can be changed in accordance with brightness by means of computing the luminance of the electronic data pertaining to an image input from a predetermined color component, and computing smoothing intensity from the luminance. Consequently, noise dependent on the luminance component can be effectively eliminated by means of intensively smoothing a luminance region involving a high distribution of noise and less-intensively smoothing a luminance region involving a low distribution of noise.

Smoothing intensity can be computed not only from luminance but from the intensity of a predetermined color component, such as the intensity of a monochromatic component or a sum of intensities of a plurality of color components. Consequently, the smoothing intensity can be changed in accordance with the intensity of a predetermined color component, thereby obviating noise intensively from an image area involving conspicuous noise.

Furthermore, filter information is selected from the computed smoothing intensities. Electronic data are smoothed on the basis of the filter information. The filter information is set in advance for the thus-computed smoothing intensity. There is no necessity for preparing filter information each time smoothing intensity is computed. Consequently, even when a computer having low computing capability, electronic data can be smoothed immediately.

In addition, filter information may be prepared from computed smoothing intensity. On the basis of the thus-prepared file information, electronic data are smoothed. The filter information is prepared in accordance with the thus-computed smoothing intensity each time. For this reason, optimal filter information corresponding to the intensity of a predetermined color component can be prepared. Consequently, noise can be obviated more effectively from an area involving conspicuous noise, without enhancing noise included in a flat section.

BRIEF DESCRIPTIONS OF DRAWINGS

FIG. 7 is a schematic view showing filter information to be determined by smoothing intensity by means of the image processing method according to the first embodiment;

DETAILED DESCRIPTION OF PREFERRED EMBODIMENTS

A plurality of embodiments according to the present invention will be described with reference to the drawings.

First Embodiment

Figure 2:
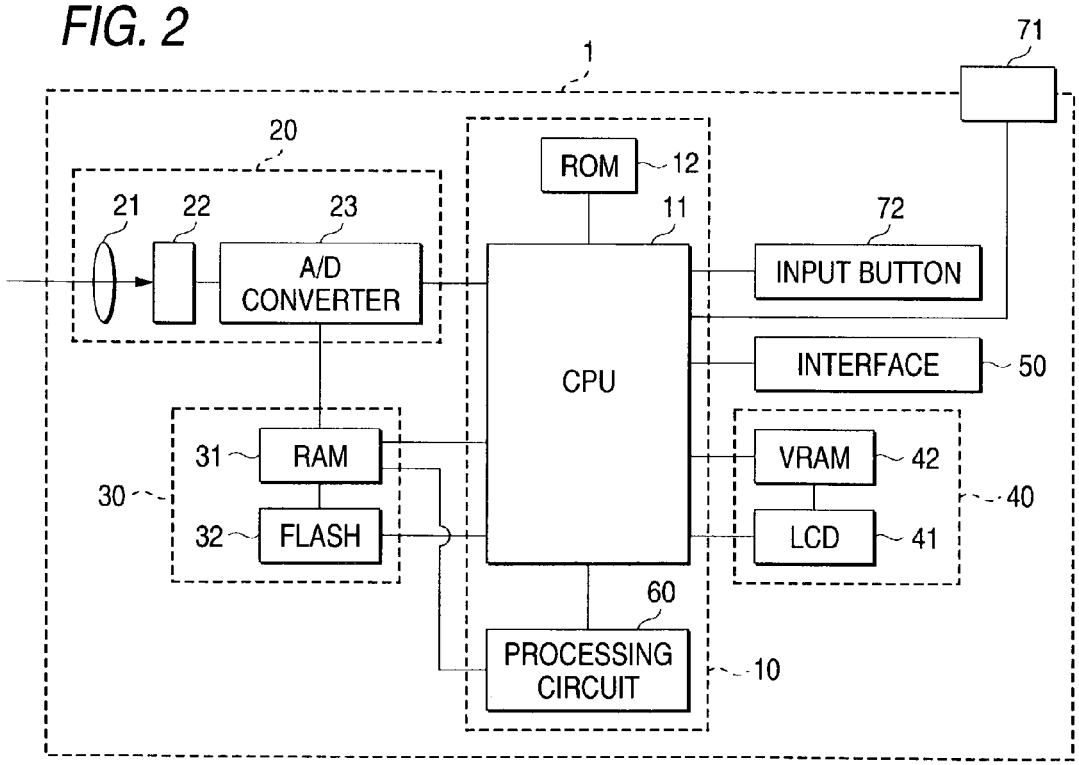
FIG. 2 is a block diagram showing a digital camera according to the first embodiment.

FIG. 2 shows a digital camera 1 to which an image processing apparatus according to a first embodiment is applied.

As shown in FIG. 2, the digital camera 1 comprises a control section 10, an image input unit 20, a recording section 30, a display section 40, and an interface 50.

The control section 10 is an electrical circuit for processing electronic data output from the image input unit 20. The control section 10 includes a CPU (central processing unit) 11, ROM (read only memory) 12, and a processing circuit 60. A computer program to be executed by the CPU 11 of the control section 10 and by the processing circuit 60 is recorded in the ROM 12.

Figure 3:
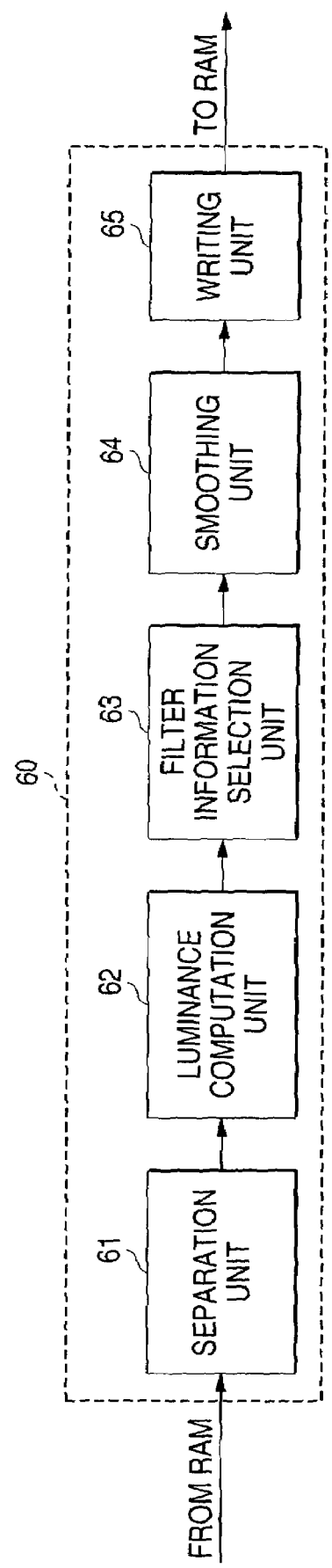
FIG. 3 is a block diagram showing a processing circuit of the digital camera according to the first embodiment.

As shown in FIG. 3, the processing circuit 60 comprises separation unit 61, color intensity computation unit 62, a filter information selection unit 63, a smoothing unit 64, and a writing unit 65.

As shown in FIG. 2, the control section 10 is connected to an input unit for receiving an instruction entered by a user. The input unit includes a shutter button 71 by way of which the user inputs an instruction for effecting photographing operation, and a plurality of input buttons 72 by way of which operations pertaining to various functions of the digital camera 1 are input.

The image input unit 20 includes a condensing lens 21, a CCD 22, and an analog-to-digital converter 23. The condensing lens 21 converges to the CCD 22 the light reflected from the subject. The CCD 22 has a plurality of image pickup elements, which are arranged horizontally and vertically in a matrix pattern. One image pickup element constitutes one pixel.

A color filter is disposed on a light-receiving side of each of the image pickup elements. Complementary color filters constituted of cyan (Cy), magenta (Mg), yellow (Ye), and green (G) colors are employed. The complementary color filters for the CCD 22 are arranged in the manner as shown in, e.g., FIG. 4. The color filters permit transmission of the following colors from among the three primary colors of light: that is, red (R), green (G), and blue (B). Here, Cy=G+B, Mg=B+R, and Ye=G+R. In other words, one filter permits transmission of light of two colors.

The light that has entered each of the image pick up elements of the CCD 22 is converted into an electric signal, and the signal is output. The electric signal output from the CCD 22 is an analog signal, and the analog-to-digital converter 23 converts the analog signal into digital electronic data.

The recording section 30 includes RAM (random access memory) 31 and flash memory 32. DRAM (dynamic RAM) having a self-refreshing function is employed as the RAM 31. The flash memory 32 is a rewritable recording medium which can hold recorded data without energization. The flash memory 32 is incorporated into the digital camera 1 or removably attached to the digital camera 1.

The RAM 31 temporarily stores the digital electronic data processed by the control section 10 or the digital electronic data output from the analog-to-digital converter 23. The flash memory 32 accumulates and stores the electronic data temporarily recorded in the RAM 31. Further, filter information (described later) is recorded in the flash memory 32.

The display section 40 includes a liquid display device LCD) 41 and VRAM (Video RAM) 42. The LCD 41 displays an image based on the electronic data recorded in the flash memory 32 or on the electronic digital data output from the analog-to-digital converter 23. The VRAM 42 stores display data which are prepared, from the electronic data, for display on the LCD 41.

The interface 50 outputs the electronic data recorded in the flash memory 32 to external equipment, such as a personal computer.

Next, processing to be performed by the control section 10 will be described in detail.

As mentioned previously, the control section 10 has a processing circuit 60. The processing circuit 60 is an arithmetic unit designed specifically for performing image processing. The processing circuit 60 executes predetermined processing in accordance with a computer program recorded in the ROM 32.

Figure 1:
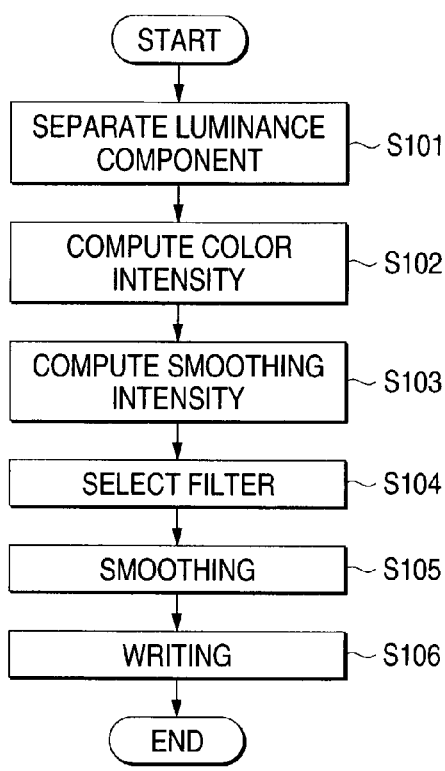
FIG. 1 is a flowchart showing the flow of an image processing method according to a first embodiment of the present invention.

With reference to FIGS. 1 and 3, processing to be performed by individual units of the processing circuit 60 and the flow of processing will now be described. Processing to be described by the individual units of the processing circuit 60 is subjected to pipeline processing without involvement of use of the CPU 11.

Separation Unit

The separation unit 61 separates a luminance component serving as a color component from the image information which has been input by way of the CCD 22 and converted into electronic data by the analog-to-digital converter 23 (S101).

The electronic data, which have been output from the image pickup elements of the CCD 22 and converted from an analog electric signal into electronic digital data by the analog-to-digital converter 23, are temporarily stored in the RAM 31. The electronic data that have been output from the image pickup elements and stored in the RAM 31 comprise a luminance component and color-difference components.

Figures 4, 5, 6:
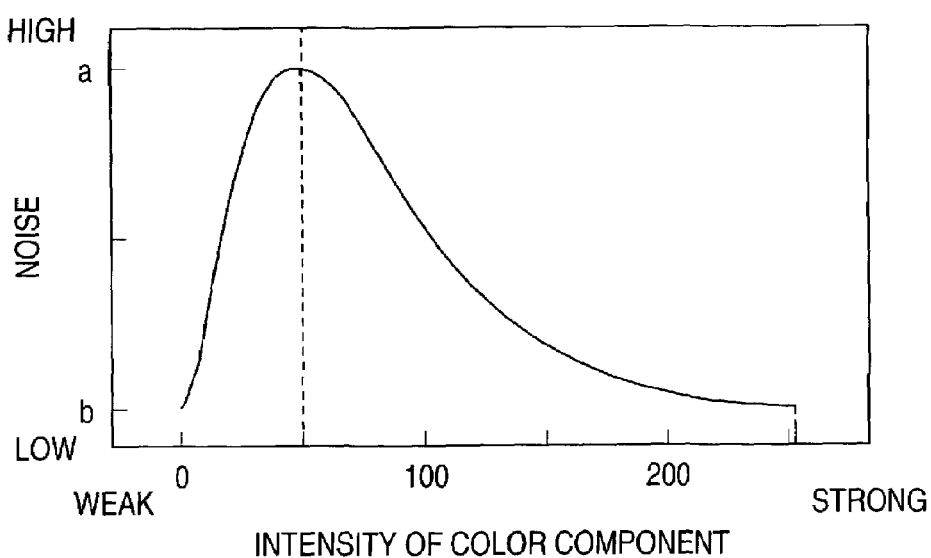
FIG. 4 is a schematic view showing a CCD of the digital camera according to the first embodiment.
FIG. 5 shows a relationship between brightness and noise.
FIG. 6 is a schematic view showing a 5-by-5 matrix centered on a pixel of interest for describing the image processing method according to the first embodiment of the invention.

In the case of the CCD 22 having the complementary color filters, a luminance component Y, a color-difference component Cr, and a color-difference component Cb are computed from the electronic data output from four adjacent image pickup elements, as shown in FIG. 4. The equation to be used for computing the luminance component Y is provided below.

$$\text{Luminance } Y = \{(Mg+Cy)+(G+Ye)\}/4 \quad (1)$$

Mg, Cy, G, and Ye included in Eq. (1) represent the magnitude of electronic data output from four adjacent pixels; that is, the level of gray. More specifically, the luminance component Y is computed from predetermined color components: Mg, Cy, G, and Ye.

Luminance Computation Unit

In connection with the luminance component separated from the electronic data by means of the separation unit 61; that is, the electronic data output from four adjacent image pickup elements, the color intensity computation unit 62 computes the luminance component Y. The color intensity computation unit 62 computes the luminance component Y by means of Eq. (1) (S102)

Filter Information Selection Unit

The filter information selection unit 63 computes smoothing intensity σ from the luminance component Y computed by the color intensity computation unit 62. From the thus-computed smoothing intensity σ, the filter information selection unit 63 selects filter information recorded in the flash memory 32. A plurality of filter information items are prepared so as to correspond to the luminance component Y.

Procedures for selecting a filter are as follows. The filter information selection unit 63 computes the smoothing intensity σ from the luminance component Y (S103). The smoothing intensity σ is computed by Eq. (A) provided below, wherein "a" denotes a proportionality constant to be used for determining the maximum smoothing intensity, and "b" denotes an offset value to be used for determining the minimum smoothing intensity. As in the case of the present embodiment, if a smoothing range corresponds to the domain of 5×5 centered on the pixel of interest, 0.5<b<a<10 is a desirable relationship. Further, "e" denotes a natural logarithm, and "n" denotes luminance at which the amount of noise becomes maximum. In the present embodiment, "n" is set to 50.

$$\sigma = N(Y) = \left(\frac{eY}{n}\right)^2 \exp\left(-\frac{2Y}{n}\right) \quad \text{(A)}$$

Eq. (A) is made an approximate equation by the relationship between the luminance component Y and the amount of noise. As a result of the relationship between the luminance component Y and a noise level N having been determined in connection with the image input through use of the image input unit 20, the noise level becomes greater as the luminance component Y becomes smaller from a high brightness level to a low brightness level. Noise becomes maximum at a certain brightness level "n." The noise level N tends to become lower when the luminance component Y approaches 0. In short, the noise level N is dependent on the luminance component Y. Equation (A) is an approximation of the relationship between the noise level N and the luminance component Y. FIG. 5 is a plot of Eq. (A). Eq. (A); that is, an approximation, changes according to an apparatus which performs processing.

Therefore, noise dependent on the luminance component Y can be effectively eliminated by means of intensively smoothing a luminance region involving a high distribution of noise and less-intensively smoothing a luminance region involving a low distribution of noise.

A distribution expression to be used for smoothing is defined as Eq. (B) provided below on the basis of the Gaussian function. In Eq. (B), σ denotes smoothing intensity to be computed by Eq. (A). Here, "x" and "y" denote coordinates (0, 0) of a certain pixel Pn of interest, as shown in FIG. 6. In other words, "x" and "y" denote a coordinate system (x, y) of a 5-by-5 matrix M centered on the pixel Pn of interest. The matrix M is not limited to 5-by-5, but may be a 3-by-3 matrix or a 7-by-7 matrix. For instance, pixel P1 shown in FIG. 6 assumes coordinates of (−2, −2); pixel P2 assumes coordinates of (−1, −2); and pixel P25 assumes coordinates of (2, 2).

$$\delta_\sigma(x, y) = \frac{1}{2\pi\sigma^2} \exp\left(-\frac{x^2 + y^2}{2\sigma^2}\right) \quad \text{(B)}$$

Eq. (C) provided below is derived from a relationship between the smoothing intensity σ provided in Eq. (B), the luminance Y provided in Eq. (A), and the noise level N.

$$\delta'(x, y) = \frac{1}{2\pi N(Y)^2} \exp\left(-\frac{x^2 + y^2}{2N(Y)^2}\right) \quad \text{(C)}$$

A distribution σ (x,y) of information pertaining to the pixel Pn of interest corresponding to the electronic data pertaining to the pixel Pn of interest responsive to the luminance component Y can be derived from Eq. (C). For example, when the smoothing intensity σ assumes 0.5, 1, 2, 3, 4, 5, 6, and 9, distributions such as those shown in FIG. 7 are prepared in the form of 5-by-5 matrix centered on the pixel Pn of interest, by means of Eq. (C).

Numerals provided in the respective matrices for filter information shown in FIG. 7 represent rates at which the electronic data pertaining to the pixel Pn of interest are to be distributed from the pixel Pn to the remaining pixels constituting the 5-by-5matrix. A numeral provided at the lower right position of each of the filter information items represents a total sum of the numerals provided in the corresponding matrix. The rate at which information is to be distributed from the pixel Pn of interest to the other pixels constituting the 5-by-5 matrix is determined by the numeral of each matrix/the total sum.

From FIG. 7, it is understood that smoothing to which the matrix centered on the pixel Pn of interest is to be subjected is averaged as the smoothing intensity σ becomes greater. Specifically, FIG. 7 shows that the electronic data pertaining to the pixel Pn of interest is dispersed evenly to the other pixels constituting the 5-by-5 matrix.

In the case of the present embodiment, filter information has been prepared beforehand so as to correspond to the smoothing intensity σ rather than a distribution of smoothing intensity being computed from the calculated smoothing intensity σ on a per-pixel basis. The filter information is recorded in the flash memory 32.

Therefore, the filter information selection unit 63 computes the smoothing intensity σ for the pixel Pn of interest from the luminance component Y computed by the color intensity computation unit 62, by means of Eq. (A). Filter information corresponding to the thus-computed smoothing intensity σ is selected and read from the flash memory 32. For instance, when the smoothing intensity a computed by the color intensity computation unit 62 in accordance with Eq. (A) assumes a value of 2, filter information corresponding to σ=2 shown in FIG. 7 is selected and read from the flash memory 32 (S104).

Smoothing Unit

When the filter information selection unit 63 has selected filter information, smoothing operation is performed on basis of the electronic data output from the pixel Pn of interest, and the selected filter information (S105). Smoothing operation is performed, by means of multiplying by a value of filter information the electronic raw data output from the certain pixel Pn of interest.

Figure 8:
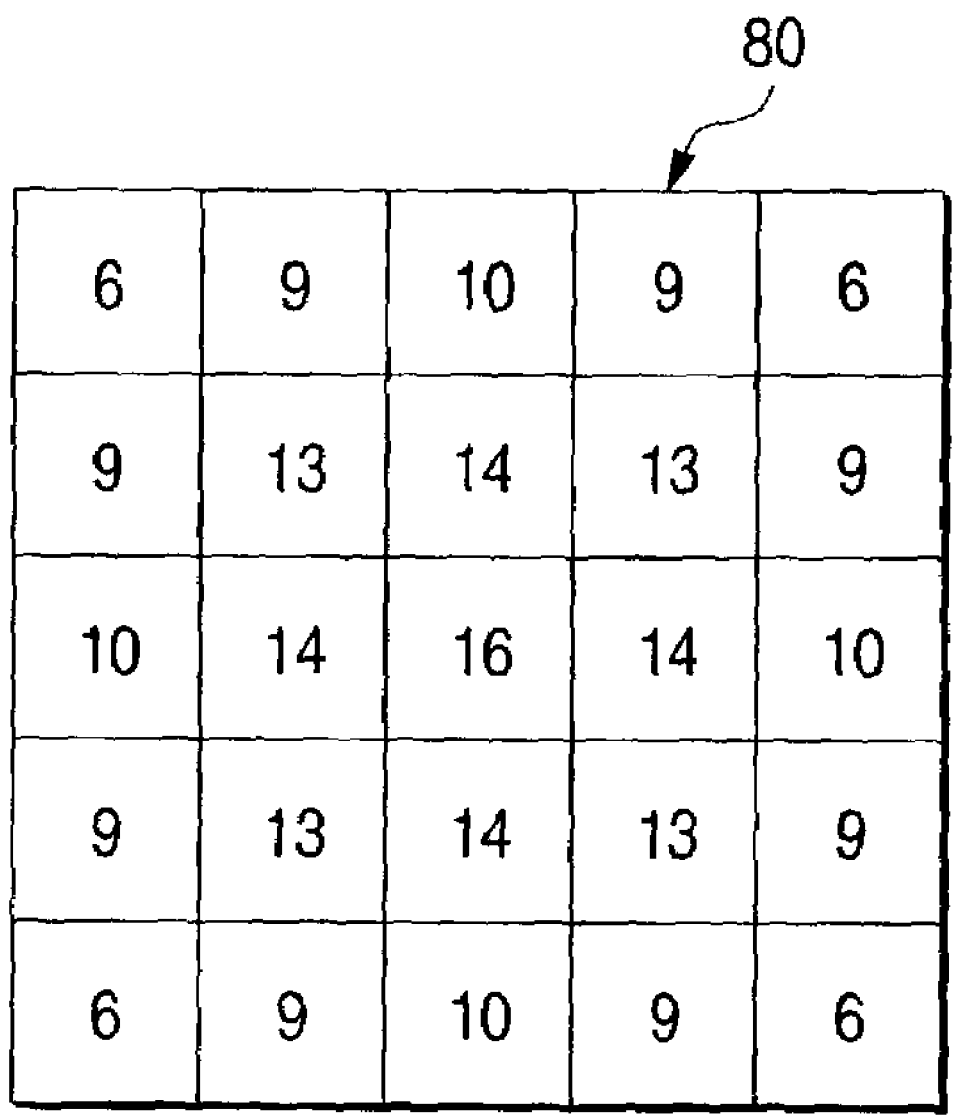
FIG. 8 is a schematic view showing filter information obtained when smoothing intensity σ assumes a value of 2.

For instance, provided that smoothing intensity a is computed from the electronic data output from the pixel Pn of interest and that the smoothing intensity 94 assumes a value of 2, the filter information selection unit 63 selects filter information 80 such as that shown in FIG. 8. As a result of the electronic raw data output from the pixel Pn of interest being multiplied by a value of filter information shown in FIG. 8 (i.e., a numeral of a matrix /a total sum), information pertaining to the pixel Pn of interest is dispersed to all pixels located in the 5-by-5matrix centered on the pixel Pn of interest. All pixels constituting an image; that is, all pixels of the CCD 22, are subjected to the smoothing set forth. Since 24 pixels are subjected to smoothing with regard to one pixel, each pixel participates in 25 smoothing operations. A total sum of results of smoothing, to which surrounding pixels are subjected, becomes post-smoothing electronic data. Each of the components; that is, luminance Y, color-difference Cr, and color-difference Cb, is subjected to smoothing.

Writing Unit

When the smoothing unit 64 has finished smoothing operation, the electronic data that have finished undergoing processing are written into the RAM 31 by the writing unit 65 (S106).

When electronic data equivalent to one picture have been written into the RAM 31 by the writing unit 65, the electronic data stored in the RAM 31 are compressed in order to reduce the volume of data to be recorded into the flash memory 32. As a compression scheme in the case of an image photographed by the digital camera 1, there has been employed a file format such as JPEG (Joint Photographic Experts Group) or TIFF (Tagged Image File Format) The thus-compressed electronic data are recorded in the flash memory 32.

(1) When an unillustrated power switch of the digital camera 1 is turned on, the digital camera 1 enters a wait state in which the camera can perform photographing operation at any time. The CCD converts the light condensed by the condensing lens 21 into an electric signal, in a fraction of a second to hundreds of a second. The thus-converted electric signal is converted into digital electronic data by the analog-to-digital converter 23. When the user uses the LCD 41 as a finder, the electronic digital data output from the analog-to-digital converter 23 are transferred to the VRAM 42, where an object of photographing is displayed on the LCD 41 as a motion picture.

(2) When the shutter button 71 is pressed to an intermediate point in the operating range thereof by the user; that is, to a "half-pressed" state, a light exposure setting and a focus are set and fixed. Light exposure to be used for photographing can be changed, by means of the CPU 11 of the control section 10 controlling an aperture of the light condensing lens 21 and a shutter speed; that is, a time at which electric charges are stored in the CCD 22. A shutter of the digital camera 1 is embodied as a mechanical shutter for physically interrupting light or an electronic shutter for controlling the time at which electric charges are stored in the CCD 22, or both.

(3) When the user has pressed the shutter button 71 to the limit of a operating range; that is, to a "fully-pressed state," the following processing is performed. A subject is subjected to accurate metering and focusing. After completion of metering and focusing, the electric charges accumulated in the CCD 22 are temporarily discharged, and the light reflected from the subject enters the CCD 22 by way of the light condensing lens 41. On the basis of the amount of electric charges corresponding to the quantity of light having entered the CCD 22, the CCD 22 outputs an electric signal.

(4) The electric signal output from the CCD 22 is converted into digital electronic data by the analog-to-digital converter 23. The digital electronic data are addressed directly to the RAM 31 without involvement of the CPU 11 of the control section 10 and are temporarily stored in the RAM, through DMA (direct memory access) for speedup purpose.

(5) The electronic data stored in the RAM 31 are subjected to the previously-described processing by means of the processing circuit 60. Subsequently, the data are prepared as appropriate electronic data pertaining to a color image. In order to increase the number of images to be recorded into the flash memory 32, the electronic data are compressed into electronic data of another file format such as JPEG.

(6) After compression of the electronic data has been completed, the electronic data are duplicated from the RAM 31 and recorded in the flash memory 32.

As has been described, the digital camera 1 according to the first embodiment computes the smoothing intensity σ from the luminance component Y included in the electronic data output from the image input unit 20. The filter information items computed from the smoothing intensity σ have been recorded beforehand in the flash memory 32. Therefore, filter information is selected and read on the basis of computed smoothing intensity σ, thereby obviating a necessity of preparing filter information each time the smoothing intensity σ is computed. The smoothing intensity σ is set in accordance with the luminance component Y so as to become lower when the luminance component Y is high and to become higher when the luminance component Y is low. Accordingly, noise can be intensively removed from a portion of an image involving a low luminance component Y without enhancing noise included in a portion of an image involving lower noise and a high luminance component Y.

Operations ranging from separation of a luminance component to recording into the flash memory 32 of the electronic data that have finished undergoing smoothing are performed through pipeline processing by means of the custom-designed processing circuit 60 and without use of the CPU 11. Consequently, electronic data can be processed quickly.

Second Embodiment

Figure 9:
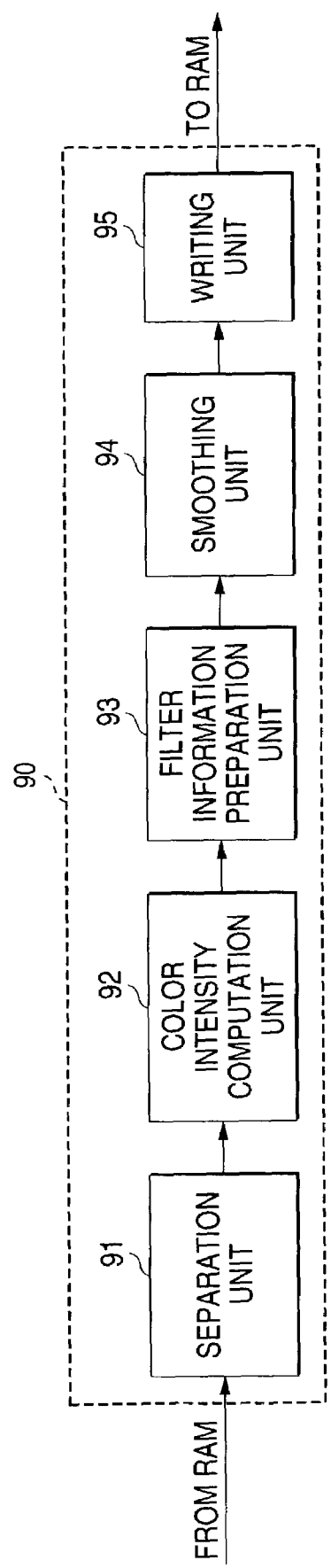
FIG. 9 is a view showing a processing circuit of the digital camera according to the second embodiment.
Figure 10:
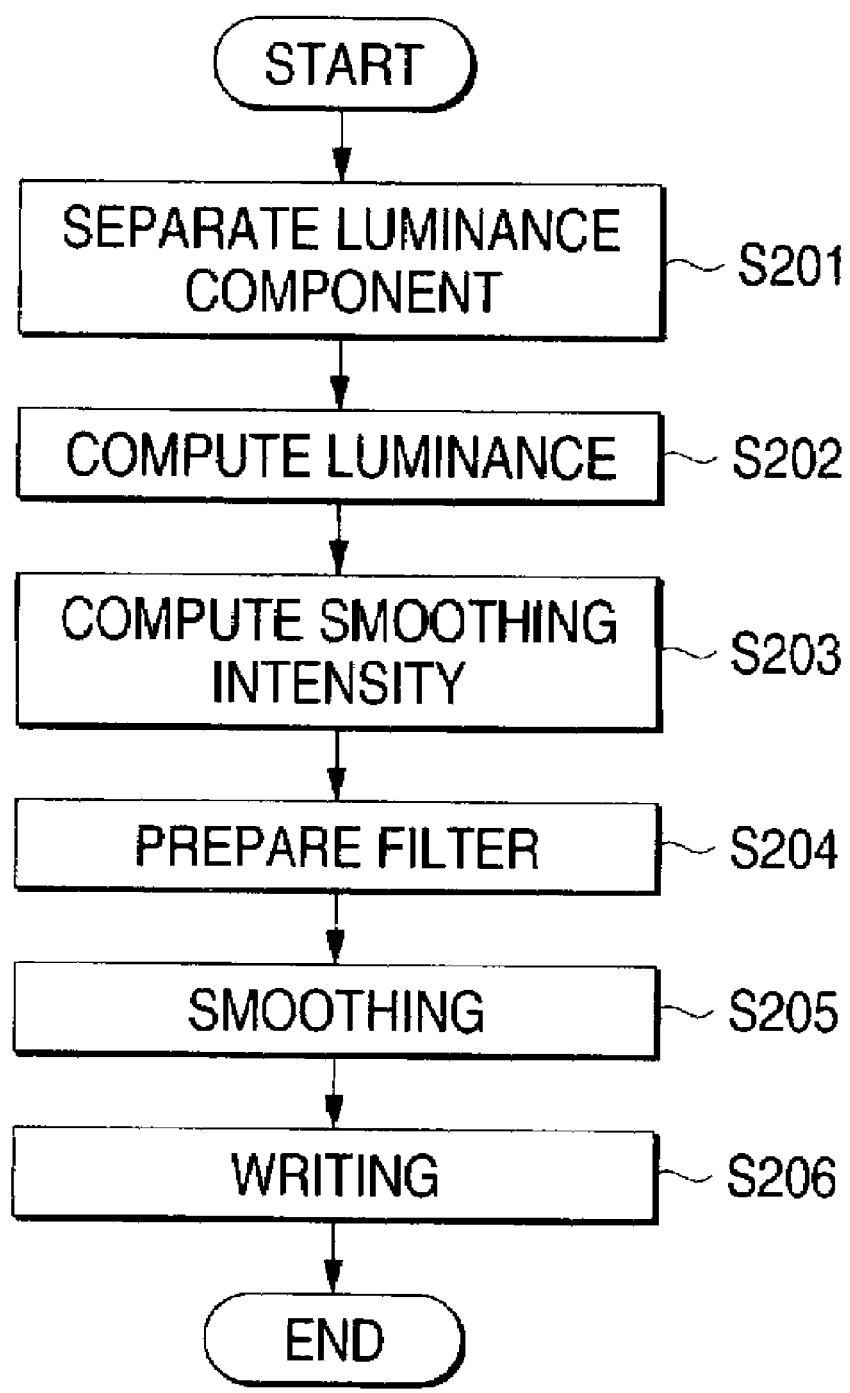
FIG. 10 is a flowchart showing flow of the image processing method according to the second embodiment.

FIG. 9 shows a processing circuit 9 of a digital camera according to a second embodiment of the present invention, and processing procedures are shown in FIG. 10. Explanations of those structural areas and procedures which are substantially the same as those described in connection with the first embodiment are omitted.

The second embodiment differs from the first embodiment in that filter information is prepared each time the luminance component Y is computed.

As shown in FIG. 9, the processing circuit 90 of the digital camera according to the second embodiment includes a separation unit 91, a color intensity computation unit 92, a filter information preparation unit 93, a smoothing unit 94, and a writing unit 95.

The separation unit 91 and the color intensity computation unit 92 are the same as those described in connection with the first embodiment. The filter information preparation unit 93 computes the smoothing intensity σ from the luminance component Y computed by the color intensity computation unit 92, in accordance with Eq. (A). By means of Eq. (C), filter information is prepared. More specifically, each time the luminance component Y included in the electronic data output from each of the pixels of the image, filter information is prepared for each of the pixels.

In the second embodiment, the luminance component is separated from the electronic data output from the CCD 22 (S201) Procedures for computing the luminance factor Y from the thus-separated luminance component (S202) are identical with those described in the first embodiment. In the second embodiment, the smoothing intensity σ is computed from the thus-computed luminance component Y by the filter information preparation unit 93 (S203), thereby preparing filter information (S204). On the basis of the filter information prepared by the filter information preparation unit 93, the smoothing unit 94 smoothes the electronic data output from the pixels (S205). The thus-smoothed electronic data are recorded into the RAM 31 of the recording section 30 by the writing unit 95.

In the second embodiment, filter information corresponding to each pixel is prepared each time a luminance component Y is computed from a pixel. Thus, noise can be eliminated more effectively.

The plurality of embodiments of the present invention have described a case where a luminance component is used as a predetermined color component for a CCD having a complementary color filter. However, the filter is not limited to the complementary color filter. For example, filters of primary colors R, G, B may be used in place of the complementary color filters. When primary-color filters are used, smoothing intensity can be computed from the intensity of any one of R, G, B color components in lieu from luminance. Even in the case of a complementary color filter, smoothing intensity may be computed not solely from luminance but from the intensity of a predetermined color component.

The embodiments of the invention have described an example color image with a 256-step gradation, there may also be employed, as an input image, a color with a 1024-step gradation, a color image with a 4096-step gradation, a gray-scale image, or a binary monochromatic image.

The embodiments of the invention have described a case where the image processing apparatus is applied. The present invention may be applied not limitedly to the digital camera but to image processing to be performed an image reader, such as a scanner or a copier, or to image processing to be performed by a printer driver or software.

What is claimed is:

1. An image processing method for eliminating noise from electronic data of an input image by smoothing the electronic data, the method comprising:
   computing a smoothing intensity based on intensities of a predetermined color component output from a pixel of interest and pixels surrounding the pixel of interest, constituting a matrix centered on the pixel of interest; and
   wherein, in the computing step, the smoothing intensity is computed on the basis of a distribution expression representing the frequency of noise with respect to the predetermined color component in such a manner that when the smoothing intensity with respect to the intensity of the predetermined color component output from the pixel of interest is high, a rate at which the intensity of the predetermined color component output from the pixel of interest is to be distributed to surrounding pixels constituting the matrix is set to a large value, and when the smoothing intensity with respect to the intensity of the predetermined color component output from the pixel of interest is low, the rate at which the intensity of the predetermined color component output from the pixel of interest is to be distributed to surrounding pixels constituting the matrix is set to a small value.

2. The image processing method according to claim 1, wherein smoothing the electronic data by distributing the intensity of a pixel of interest is based on predetermined filter information selected on the basis of the smoothing intensity.

3. The image processing method according to claim 1, further comprising:
   preparing filter information on the basis of the smoothing intensity; and
   smoothing the electronic data on the basis of the filter information prepared.

4. A recording medium storing an image processing program for causing a computer to perform processing for eliminating noise from electronic data pertaining to an image entered by way of input unit, by smoothing the electronic data, the computer being caused by the image processing program to perform:
   computing a smoothing intensity based on intensities of a predetermined color component output from a pixel of interest from among a plurality of pixels constituting an image input by way of the input unit and pixels surrounding the pixel of interest constituting a matrix centered on the pixel of interest; and
   a smoothing step for smoothing the electronic data through use of the computed smoothing intensity and outputting the smoothed electronic data;
   wherein, in the computing step, smoothing intensity is computed on the basis of a distribution expression representing the frequency of noise with respect to the intensity of the predetermined color component in such a manner that when the smoothing intensity with respect to the intensity of the predetermined color component output from the pixel of interest is high, a rate at which the intensity of the predetermined color component output from the pixel of interest is to be distributed to surrounding pixels constituting the matrix is set to a large value, and when the smoothing intensity with respect to the intensity of the predetermined color component output from the pixel of interest is low, the rate at which the intensity of the predetermined color component output from the pixel of interest is to be distributed to surrounding pixels constituting the matrix is set to a small value.

5. The recording medium according to claim 4, further comprising:
   a filter information selection step of selecting predetermined filter information, on the basis of the smoothing intensity,
   wherein, in the smoothing step, the electronic data are smoothed and output through use of the predetermined filter information.

6. The recording medium according to claim 4, further comprising:
   a filter information preparation step of preparing filter information on the basis of the smoothing intensity computed in the intensity computation step, and
   wherein, in the smoothing step, the electronic data are smoothed and output through use of the prepared filter information.

7. An image processing apparatus comprising:
   an image input unit into which image information is input and which can output the image information as electronic data; and
   an intensity computation unit for computing a smoothing intensity based on an intensity of a predetermined color component included in the electronic data output from the image input unit,
   wherein the smoothing intensity is computed on the basis of a distribution expression representing the frequency of noise with respect to the predetermined color component in such a manner that when the smoothing intensity with respect to the intensity of the predetermined color component output from the pixel of interest is high, a rate at which the intensity of the predetermined color component output from the pixel of interest is to be distributed to surrounding pixels constituting the matrix is set to a large value, and when the smoothing intensity with respect to the intensity of the predetermined color component output from the pixel of interest is low, the rate at which the intensity of the predetermined color component output from the pixel of interest is to be distributed to surrounding pixels constituting the matrix is set to a small value.

8. The image processing apparatus according to claim 7, further comprising:

a storage device in which predetermined filter information is stored;

a filter information selection circuit for selecting specific filter information from the predetermined filter information on the basis of the smoothing intensity computed by the intensity computation unit;

a smoothing circuit for smoothing the electronic data output from the image input unit on the basis of the specific filter information; and a writing circuit for recording the electronic data smoothed by the smoothing unit into the storage device.

9. The image processing apparatus according to claim 7, further comprising:

a filter information preparation circuit for preparing filter information based on the smoothing intensity;

a smoothing unit for smoothing the electronic data on the basis of the prepared filter information;

a storage device for recording the electronic data smoothed by the smoothing circuit; and a writing circuit for writing the electronic data smoothed by the smoothing circuit into the storage device.

* * * * *